(12) United States Patent
Danilov et al.

(10) Patent No.: US 11,347,431 B1
(45) Date of Patent: May 31, 2022

(54) SIGNAL EVENTS FOR SYNCHRONIZATION TO FACILITATE MODE CHANGES IN A STREAMING DATA STORAGE PLATFORM

(71) Applicant: EMC IP Holding Company LLC, Hopkinton, MA (US)

(72) Inventors: Mikhail Danilov, Saint Petersburg (RU); Andrei Paduroiu, Bellevue, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 50 days.

(21) Appl. No.: 17/109,546

(22) Filed: Dec. 2, 2020

(51) Int. Cl.
  *G06F 3/06* (2006.01)
  *G06F 16/27* (2019.01)
  *G06F 9/54* (2006.01)

(52) U.S. Cl.
  CPC .......... *G06F 3/0655* (2013.01); *G06F 3/0604* (2013.01); *G06F 3/0676* (2013.01); *G06F 3/0677* (2013.01); *G06F 3/0679* (2013.01); *G06F 3/0682* (2013.01); *G06F 9/542* (2013.01); *G06F 16/27* (2019.01)

(58) Field of Classification Search
  None
  See application file for complete search history.

(56) References Cited

U.S. PATENT DOCUMENTS

| | | | | |
|---|---|---|---|---|
| 5,652,749 A * | 7/1997 | Davenport | ....... | H04N 21/64307 375/E7.277 |
| 6,993,246 B1 * | 1/2006 | Pan | ......... | H04L 67/12 386/239 |
| 7,770,183 B2 * | 8/2010 | Pietrek | ..... | G06F 9/542 719/330 |
| 8,532,171 B1 * | 9/2013 | Narayanan | ............. | H04N 19/00 375/240.01 |
| 10,812,560 B2 | 10/2020 | Kaitchuck | | |
| 11,095,570 B2 * | 8/2021 | Wu | ....... | H04L 47/823 |
| 2010/0271981 A1 * | 10/2010 | Zhao | .................. | H04L 12/1886 370/256 |
| 2018/0332366 A1 | 11/2018 | Paduroiu | | |

* cited by examiner

*Primary Examiner* — Elias Mamo
(74) *Attorney, Agent, or Firm* — Amin, Turocy & Watson, LLP

(57) ABSTRACT

The technology describes synchronization of writer and reader applications in a streaming data storage system, such as to facilitate a mode switch in which event writers can change event contents being appended to stream segments and event readers can process the event contents according to the new mode. A signal event is generated by a signaler for stream segments to which data event writes are being written, which changes the data writers' writing mode. The data storage system rejects appends of events after the signal that do not correspond to the new writing mode. The data storage system also writes a signal indicator to the segments being read at a location in each segment that is between the events written before the signal and the events written after the signal. Reader applications are synchronized based on encountering the signal indicator so as to appropriately switch to a new processing mode.

20 Claims, 12 Drawing Sheets

SIGNAL EVENTS FOR SYNCHRONIZATION TO FACILITATE MODE CHANGES IN A STREAMING DATA STORAGE PLATFORM

TECHNICAL FIELD

The subject application relates generally to data storage, and, for example, to a technology that facilitates a mode switch by synchronizing applications in storage systems that implement data streams for storing and serving continuous and unbounded data, and related embodiments.

BACKGROUND

Some contemporary data storage systems/platforms, such as DELL EMC's PRAVEGA system/data storage service, store data in a storage abstraction referred to as a data stream, or more simply, a stream. A stream is identified with a name, and can store continuous and potentially unbounded data; more particularly, a stream comprises a durable, elastic, append-only, sequence of stored events. New events are added to a tail (front) of a stream. As can be readily appreciated, PRAVEGA is thus ideal for IoT (Internet of Things) data, where devices/sensors may generate thousands of data points per second. Notwithstanding, PRAVEGA may be highly beneficial for storing data corresponding to more traditional workloads, such as financial trading data that regularly changes.

Streaming platforms often operate in a highly distributed environment. Applications that work with such platforms are asynchronous by nature. Synchronization in such systems tends to be highly complex. The scalability of a streaming platform such as PRAVEGA, in which a stream can be split into a number of parallel segments, with the number of segments automatically scaling up and down over time based on the current load the stream is receiving, make synchronization even more complex.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
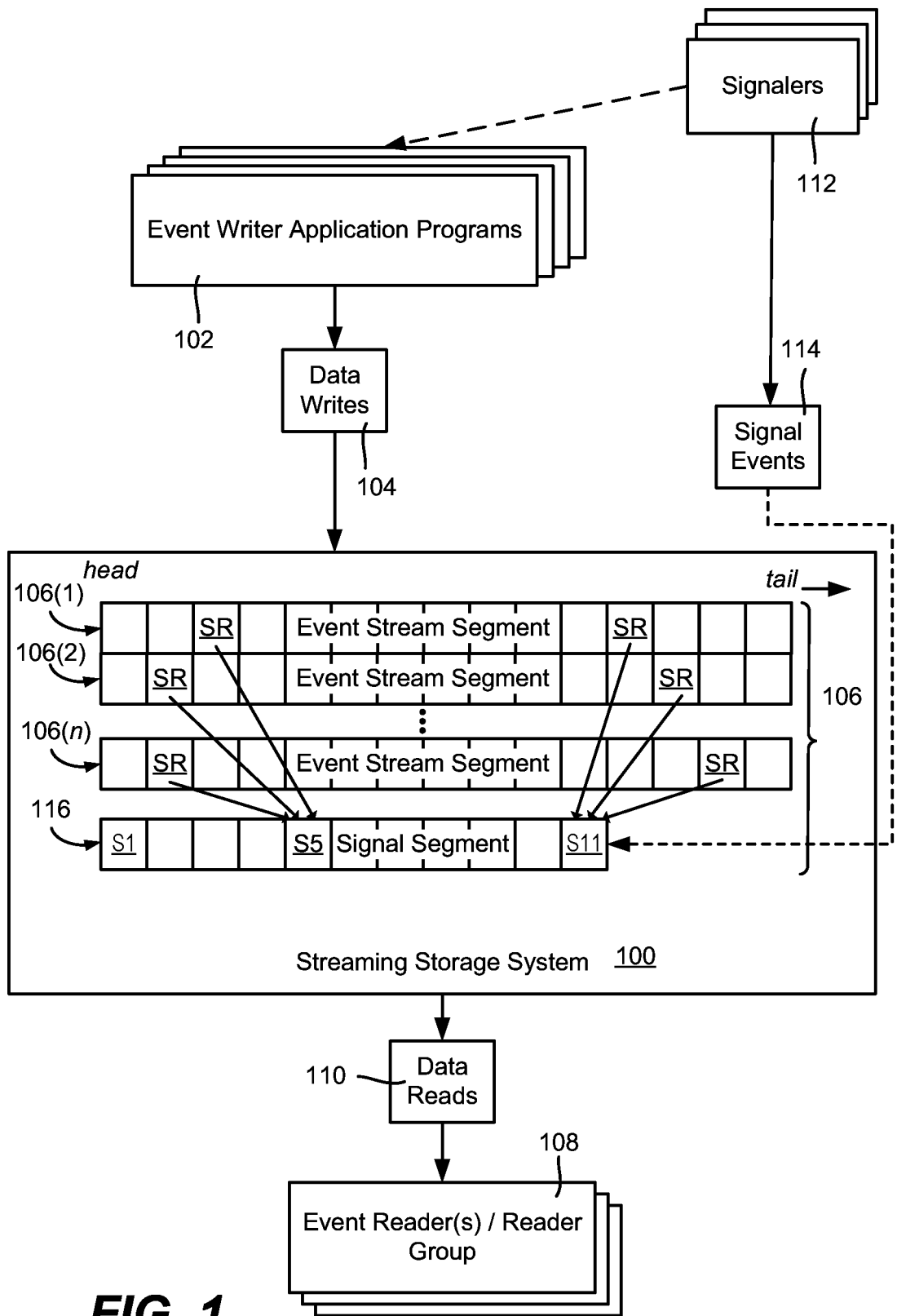
FIG. 1 is a block diagram representation of example components and data-related operations in a streaming data storage system in which signal events corresponding to a mode switch can be used to synchronize event writer applications and synchronize event reader applications, in accordance with various aspects and implementations of the subject disclosure.

Various aspects of the technology described herein are generally directed towards a synchronization technology for streaming platforms that is based on signal events. The technology facilitates safe and non-disruptive mode switching with respect to writer applications that provide the events and reader applications that consume the events.

By way of example, in some situations, there is a need to switch a streaming data storage system between different modes in a safe and a non-disruptive way. Such mode switches can correspond to changing scenarios such as day versus night differences, a change in production shifts, changing from an old to a new protocol (an upgrade scenario), and so on. Writer applications can be notified to switch from providing events based on a current (previous) mode to providing events based on a new mode. However event reader application programs, including groups of readers (a reader group) assigned to read events in different segments of a stream, need to read and process events that were created in a previous mode before the switch to the new mode was made, after which the readers need to read and process according to the new mode. Simply embedding mode information in each of the events results in significant additional processing and capacity overhead, and thus embedding the mode information is generally not practical.

The technology described herein uses a signal event for synchronization, in which a signal event is a control event that is received and processed by the readers within a reader group. Such signal events can be used to instruct readers to switch their data processing mode. Maintaining the order of events is needed, because if a signal event is created after a normal event read by a reader, the signal event needs to be consumed after the normal event is read.

It should be understood that any of the examples herein are non-limiting. For instance, some of the examples are based on PRAVEGA data storage technology; however virtually any stream-based data storage system may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 configured for supporting signal events as described herein. Event writer applications 102 send data writes 104 into the streaming data storage system 100, which are appended to the tails of the segments 106(1)-106(n) of a stream 106. Note that in general, a stream is split into segments, and the segment to which an event is appended is selected by a consistent hash computation of a routing key associated with that event; (the routing key, for example, can be based on an identifier of a device that generated the event). The number of segments can be increased or decreased over time, that is, segments can be auto-scaled based on the current event ingestion load/rate, with a corresponding change to the hash function to map the routing key space to the current number of segments. The number of segments can be on the order of millions; however there is at least one active segment at any time for a writer's events.

Applications that read events from a stream are called event readers 108, or simply readers. Each event is to be processed by exactly one reader. Two or more readers can be organized into a reader group, comprising a named collection of readers, which together perform parallel reads of the events distributed among the segments of a given stream. One reader is assigned to read events from one or more of the segments, but no two readers are assigned to read from the same segment. Thus, a normal event is consumed as data read 110 by an event reader, which can be one of many readers or part of a reader group. The logic implemented by reading applications can be referred to as stream processing.

As described herein, a signaler 112 can generate a signal event 114 corresponding to a mode change, that is, signalers can be software components that initiate mode switching. Note that creation of signal events may be based on a dedicated capability/right, meaning that ordinary writer applications are not supposed to create signals. As shown in FIG. 1 by the dashed line, a signaler 112 notifies the event writers 102 of the mode change. The writers 102 then change their operating modes to the new mode as described herein. For example a mode change can correspond to a change in the events' payloads (e.g., their format, size and/or the like); a reader 108 thus needs to know of the mode change so that the modified payload can be properly processed.

In one implementation, a signal event 114 is a control event that is received and processed by the readers 108, including those within a reader group. Such signal events can be used to instruct readers to switch their data processing mode to correspond to the mode switch. The order of the regular and signal events is significant, because whenever a signal event is created after a normal event, the signal event needs to be consumed after the normal event.

In general, there can be multiple signalers, and each signaler can work with a part of a composite system mode, for example. As shown in FIG. 1, a signaler 112 creates a signal event 114, which is propagated to the individual readers and the readers within any of the reader group(s) registered against the stream 106. The system 100 (rather than the signaler directly) can notify the writers 102 about the signal 114 as well. While the writers are to receive and process the signal 114 (or whatever mode change indication is sent directly from the signaler 112) for events immediately after being notified as described herein, the readers are to receive and process the signal when they reach the signal event's position within the stream, that is, after each reader has processed any events created before the mode switch. The readers may use or may not use the signal event as a readers' meeting point as described herein with reference to soft versus hard system policy option set on the system.

There are different ways to propagate a signal event 114 to the individual readers. One way is to write the signal event into each of the segments being read. This however becomes inefficient if the signal event consumes significant storage and there are many such segments, because the signal event is duplicated in each stream. Thus, another way is to write a signal event into a signal segment 116 of the stream, and then write a signal reference (SR) to the signal event (e.g., to signal event S11) in the signal segment 116 in each of the segments 106(1)-106(n). In one implementation, the signal reference is an offset pointer to the signal event's offset location in the signal segment 116. A size threshold can be specified for signal events (e.g., 4 kilobytes). If the size of a signal event is above the threshold, the technique with signal references SR to a signal event (e.g., S11) in a signal segment (e.g., 116) can be employed, otherwise the signal event can be embedded into the normal event stream segments 106(1)-106(n). Thus, signal segments may or may not be supported in an implementation with small-sized signals, however at least one implementation that uses a signal segment and signal references to signal events therein is described herein.

Figure 2:
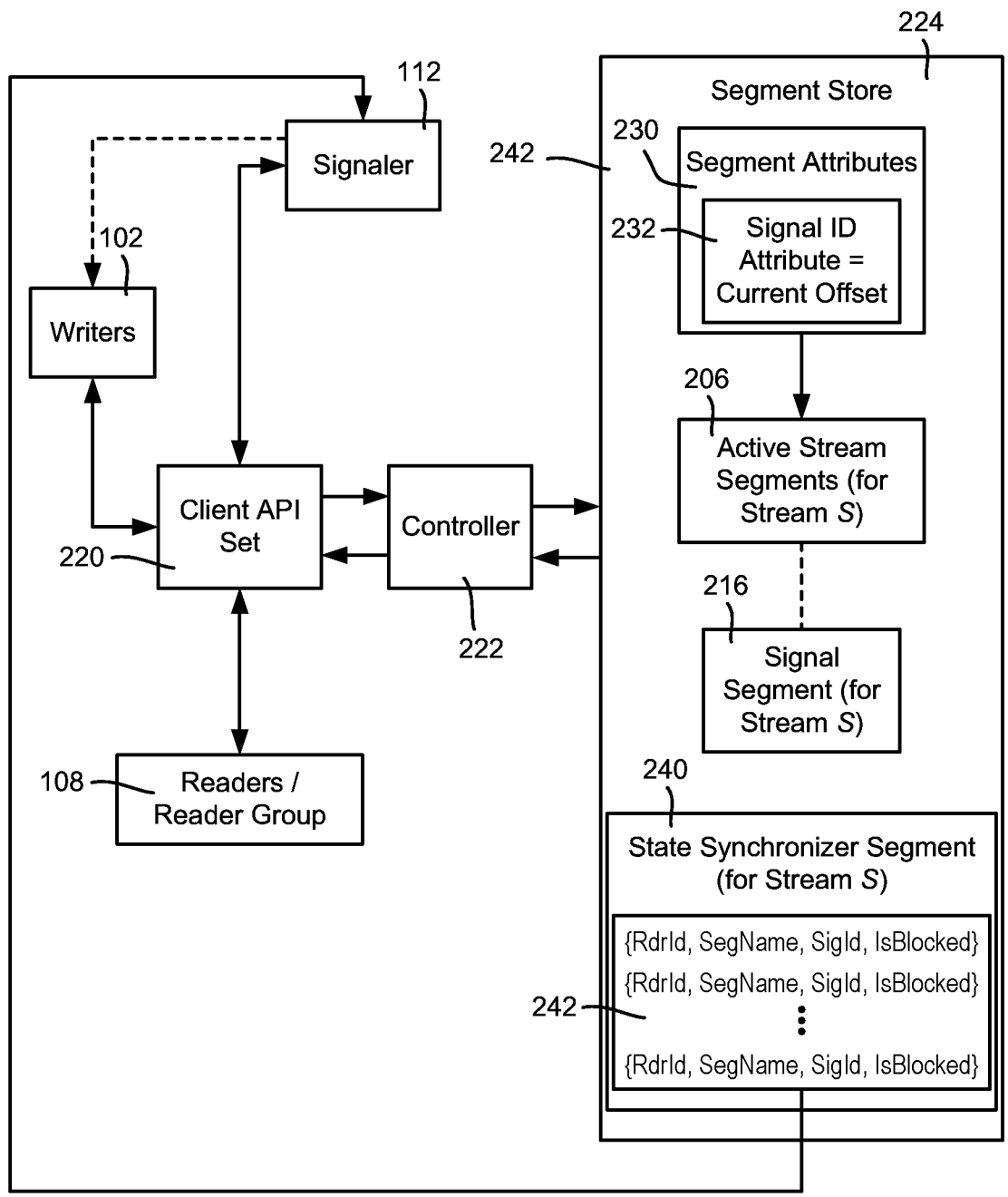
FIG. 2 is a block diagram showing example components and data structures that can be used to synchronize event writer applications and synchronize event reader applications, in accordance with various aspects and implementations of the subject disclosure.

As shown in FIG. 2, a streaming data storage system/platform such as PRAVEGA has various components, including a client component 220 that provides a set of APIs to the system, a controller 222 comprising a system coordinator, and a segment store 224 (component) that manages segments; note that a segment store can be a stream-agnostic component.

From the reader application perspective, a signal event is a sequence of bytes, similar to a normal event. Therefore, it is up to the reader application to recognize and interpret signal events. As shown in the example implementation of FIG. 2, a dedicated signal segment 216 for signal events can be added to a stream S. Note that a signal segment can be created "lazily" upon registration of a first signaler, creation of a first signal event, and so forth. In this implementation, (which employs deduplication to reduce the capacity footprint of otherwise duplicated signal events), the signal events are stored to this signal segment 216.

When a signal event is added to the signal stream 216, a signal reference (position within the signal segment) is also added to each active (that is, non-sealed) normal segment of a group of active segments 206. The reference is resolved to the signal event to serve the read operation.

An application may register an individual signal reader, or one signal reader within a reader group. A signal reader is a reader that only reads signal events. A signal reader receives a signal event before other readers, and performs any needed preparation tasks.

As multiple stream segments can be assigned to one reader, there is a risk that the reader receives one signal event multiple times. Further, in this case, the reader receives the signal event before it has received the normal events (from other segments) that had been created before the signal event was created. Therefore, the signal event can serve as a meeting point for the segments assigned to one reader as described herein. No signal event is sent to the reader before that reader has received the normal events that had been created before the signal. A synchronization mechanism between segment stores is described herein.

Considering first the write path, the system accepts a signal from a signaler 112 and propagates the signal to the active segments 206. The system needs to ensure that the writers 102 do not write any events after the signal that were meant to be written before the signal, and vice-versa (no future events should be written before the signal), otherwise readers cannot properly be synchronized. In a system/platform such as PRAVEGA, there can be a plurality of writers for each stream, and neither the segment store 224 nor the controller 222 manages the writers.

Figure 3:
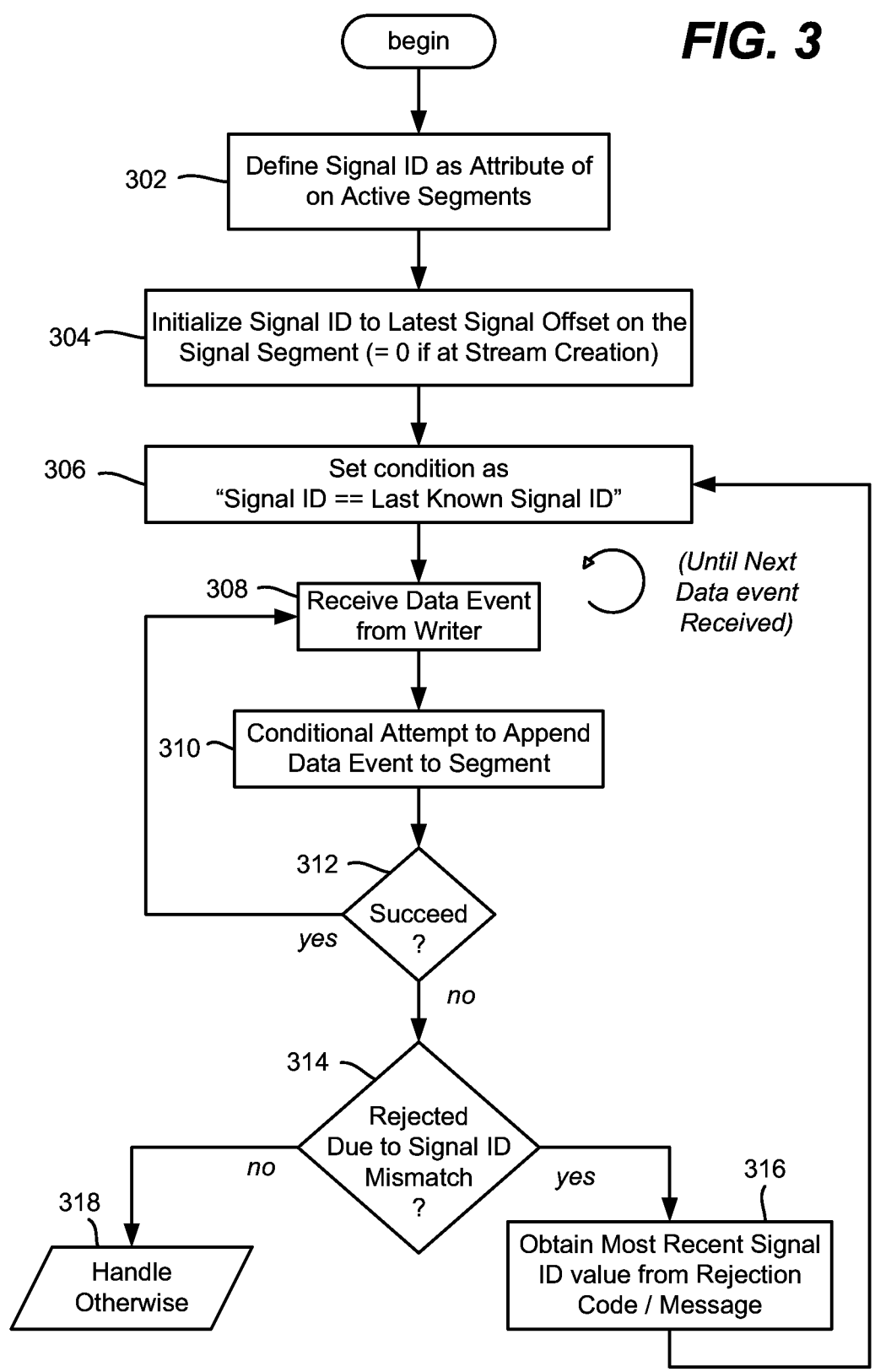
FIG. 3 is a flow diagram showing example operations related to ensuring that writer applications write events based on a current signal event, in accordance with various aspects and implementations of the subject disclosure.

Described herein is a synchronization mechanism for writers, which can be implemented in various ways. One way to implement writer synchronization, depicted in FIG. 2 and via the example operations of FIG. 3, is based on a technique referred as a metadata-conditional appends technique, in which one or more attributes 230 can be metadata associated with a segment. To this end, at operation 302, an attribute "SignalId" 232 is defined (as metadata associated with) each segment created by the controller 222 on the stream S. When a stream is created, this SignalId value can be set to zero; otherwise SignalId is initialized to whatever the latest signal event offset is within the signal segment 216, as represented by operation 304 of FIG. 3.

If signaling is enabled on the stream (which is optional), then in this example each event sent over by each writer is a metadata-conditional append, which means that whether or not the append operation succeeds is conditioned on a specified segment attribute having a certain value. For synchronizing the writers 102 as described herein, the condition is set as "SignalId==<last-known-signal-id>" as represented at operation 306.

In general, the SignalID metadata sent with the event to conditionally append needs to match the current value of the SignalID segment attribute 230 for the append operation to succeed. This is represented in FIG. 3 by operations 308, 310 and 312. If the conditional append succeeds, then it is known that no new signal has been recorded on that segment. If the append is rejected (operation 312) because the "SignalId" mismatches (operation 314), then the system knows a new signal was recorded, with the latest SignalId value obtained at operation 316 from the rejection code/message sent back. The writer receiving such a rejection indication thus knows a new signal was sent, and the writer can act accordingly. Whatever a writer does upon such a rejection is up to the upstream application, which could involve switching modes, turning off or performing any other operation(s) the application is programmed to do. Note that an append operation can fail for other reasons, (other than due to a signal mismatch as evaluated at operation 314), and if so, is handled otherwise at operation 318; such a failure condition is not further described herein.

Figure 4:
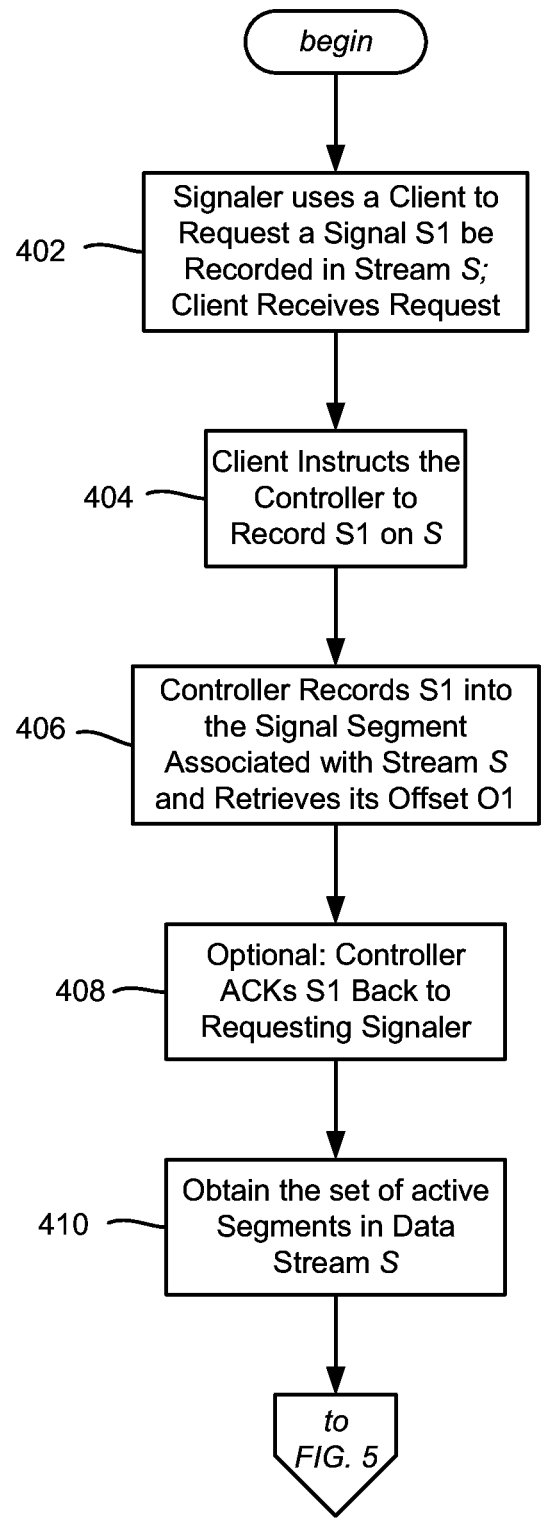
FIGS. 4 and 5 comprise a flow diagram of example operations related to handling a received signal, including to generate a signal event and update related signal information, in accordance with various aspects and implementations of the subject disclosure.
Figure 5:
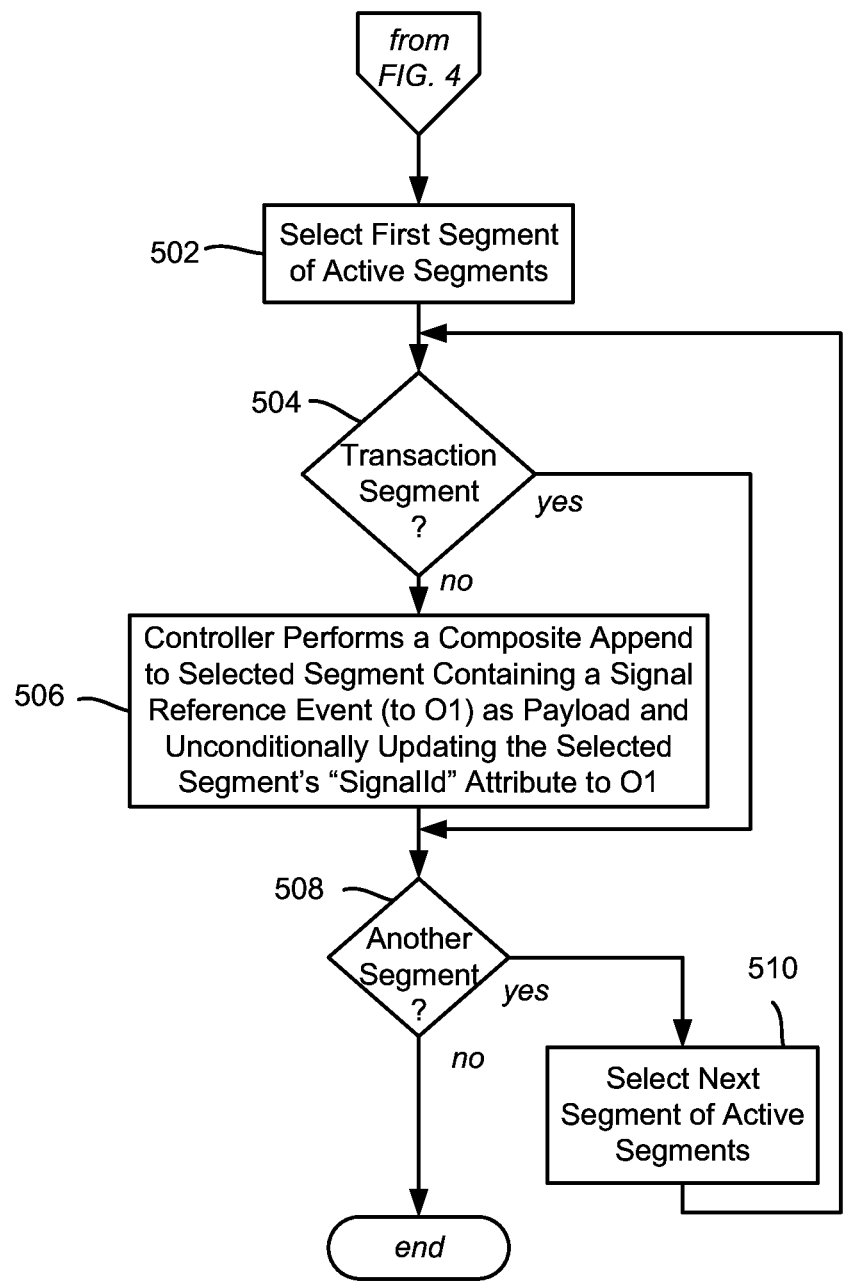

With respect to signal propagation to the active segments 206, (which is somewhat similar to initiating transactions), as represented in FIG. 2 and the flow diagram of FIGS. 4 and 5, at operation 402 of FIG. 4 the signaler 112 uses the client 220 to request that a signal event S1 be recorded in stream S. In turn, at operation 404 the client 220 instructs the controller 222 to record S1 on S, whereby the controller 222 records the signal event S1 into the signal segment 216 associated with the stream S, and retrieves the signal event S1's offset O1 (operation 406).

At operation 408, the controller 222 may acknowledge (ACK) S1 back to the requesting signaler 112. Note that subsequent signal propagation operations described below can be done in the background.

To continue with the signal propagation, at operation 410 the controller 222 looks up the set of active segments 206 in the stream S, e.g., with each active segment denoted by $S_i$. As represented by operations 502, 506, 508 and 510, for each segment $S_i$ in the active segments 206, the controller 222 makes a composite append (operation 506) containing a signal reference event (to offset O1) as the event's payload, and unconditionally updating the "SignalId" attribute to O1. In general, a composite append means that the event append occurs in conjunction with the updating of the attribute. It should be noted that transaction segments (if any) are excluded via operation 504. These will be merged in (if at all) either before or after into an active segment at one point.

Note that the controller 222 may not immediately execute the composite append action. More particularly, in order to maintain the consistency of the stream (and its metadata), the controller 222 may queue up the composite append up and execute it in order relative to other operations, such as if the controller is currently in the middle of a scale operation, transaction commit, and so forth.

To summarize, because the "SignalId" attribute has changed on the segment, any normal events that arrived on the segment store 224 prior to the signal event are accepted and belong to the "time" before this signal. Any immediate normal events that arrive on the segment store 224 after the signal event will be rejected if they are not aware of (accompanied by) the new signal (SignalId) or accepted if they are aware of the new signal. In this way, the writers are synchronized by the system, in that any writer cannot have a pre-signal (pre-mode change) event appended to a segment after the position of the signal event reference (or alternatively the signal event itself), nor can a writer have a post-signal (post-mode change) appended before the position of the signal event reference (or signal event) in the segment.

Turning to aspects related to synchronization with respect to the read path, the system needs to ensure that no signal event is sent to the reader before the reader has received the normal events that had been created before the signal. It is feasible to do this via complex synchronizations involving the segment store and controller, however this is generally impractical when there are a considerable number of signals for a large number of readers/reader groups per stream; (for example, a PRAVEGA cluster can handle thousands or even millions of streams).

Readers within a reader group already have some synchronization (for instance, to distribute segments between readers) via a state synchronizer (such as described in U.S. Pat. No. 10,812,560). One implementation can leverage this technology to further synchronize readers with respect to signal events; however another implementation described herein is based on an alternative state synchronizer for readers.

Figure 6:
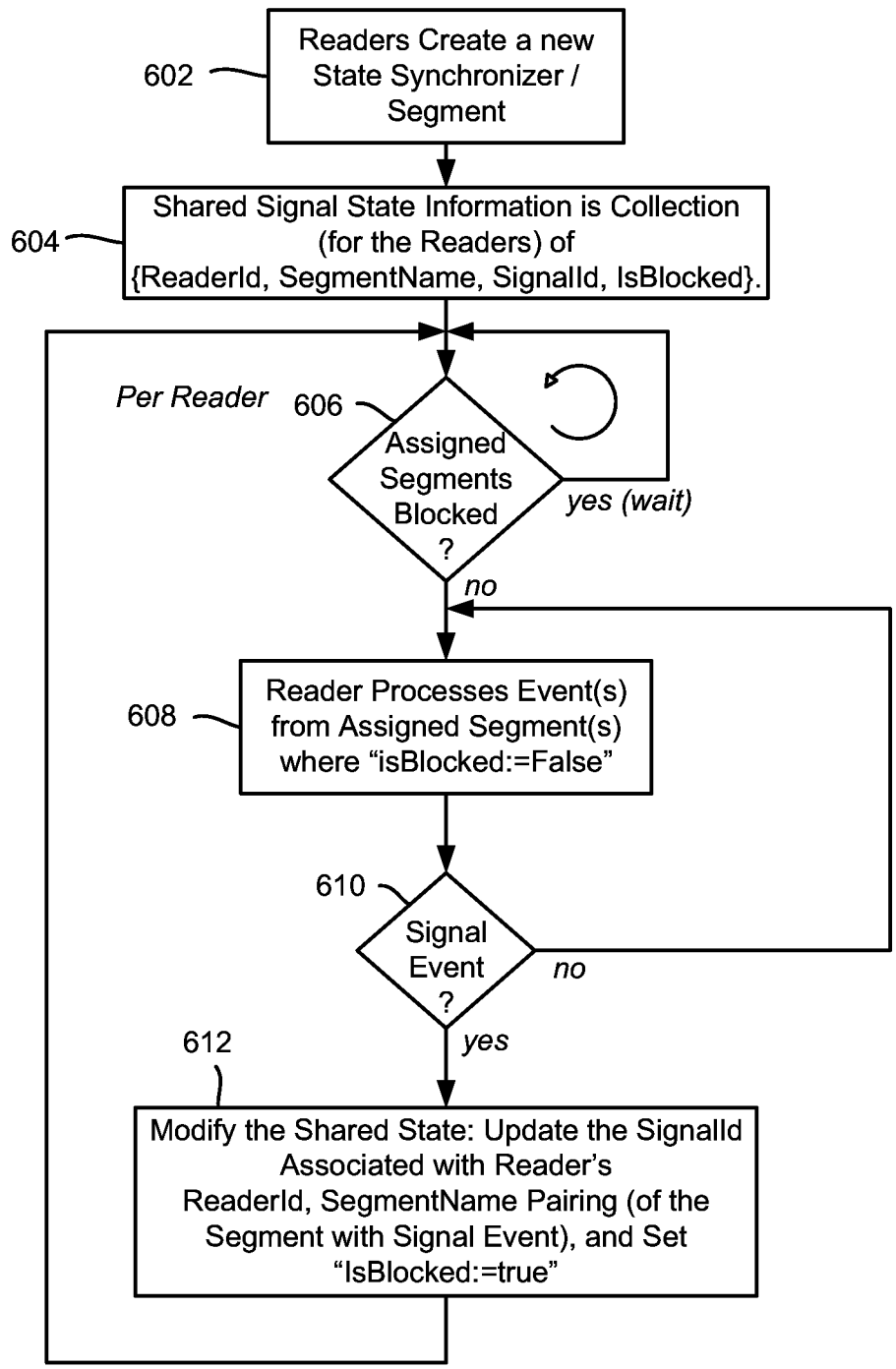
FIG. 6 is a flow diagram showing example operations related to synchronizing readers based on encountering a signal event in a data stream, in accordance with various aspects and implementations of the subject disclosure.

In one aspect, as generally represented in FIG. 2 and the flow diagram of FIG. 6, at operation 602 the readers create a state synchronizer to synchronize on the processed signals; note that the created state synchronizer creates a dedicated state synchronizer segment 240 for shared state information as shown in FIG. 2. Further note that this synchronizer segment 240 is separate from and does not affect the signal segment 216 described on the write path.

To provide for reader synchronization, the shared signal state information 242 is defined as a collection of tuples {ReaderId, SegmentName, SignalId, IsBlocked}, (corresponding to block 604 of FIG. 6, and as shown somewhat abbreviated in FIG. 2 for space purposes as {RdrId, SegName, SigId, IsBlocked}). Note that as set forth herein, one or more segments may be assigned to the same reader, but a segment is only assigned to a single reader. Thus, there is one such tuple in the shared state information 242 (collection) for each such reader-segment (ReaderId, SegmentName) pairing; the tuple further indicates the highest SignalId encountered for that segment and whether the reader is blocked ("IsBlocked==true") from reading further on that segment. There are not two (or more) such tuples that reference the same segment.

As a reader (that is not fully blocked from reading its assigned segments at operation 606) reads a segment at operation 608 to which a signal event (or signal event reference) has been written as described herein, the reader eventually encounters the signal event as detected via operation 610. Note that operations 606, 608, 610 and 612 are per reader. When a reader processes a signal event from one of the reader's assigned segments, at operation 612 the reader modifies the shared state in the segment 240 by updating the SignalId in the tuple associated with the reader's ReaderId, SegmentName pairing (for the segment on which the reader encountered the signal event), and further by setting "IsBlocked:=true" in the tuple for the ReaderId, SegmentName pairing. The reader then stops reading from that segment, and via operation 606 stops reading altogether when all of its assigned segments are blocked.

Figure 7:
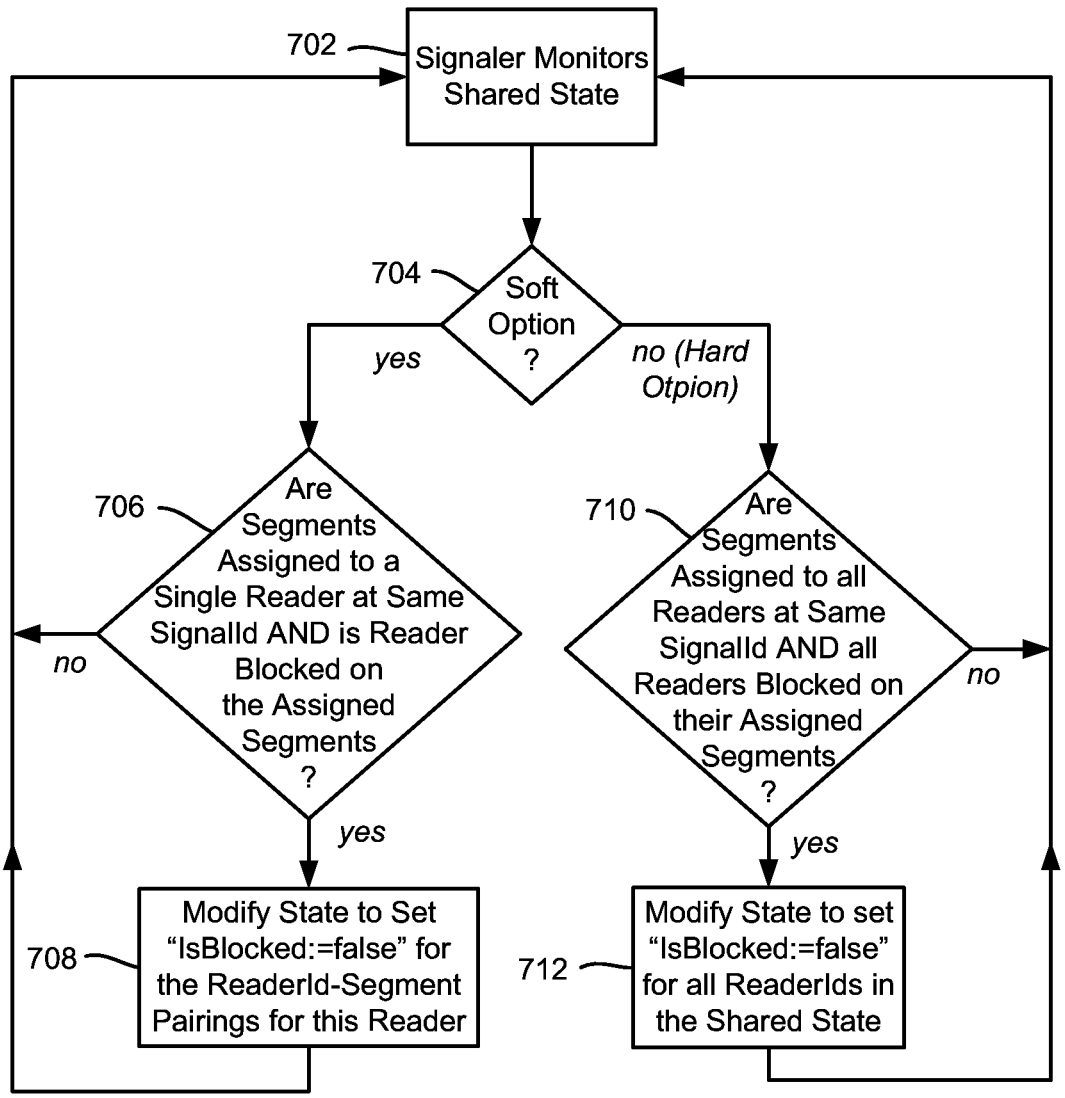
FIG. 7 is a flow diagram showing example operations for resuming blocked readers when synchronized based on a signal event, in accordance with various aspects and implementations of the subject disclosure.

As represented by operation 702 of FIG. 7, the signaler 112 (or another component) is monitoring this shared state information 242 and making changes to the shared state information 242 as needed. To this end, the signaler 112 takes actions when the signaler 112 is notified of a change (by a reader that updated the SignalId and set the IsBlocked flag to true).

The signaler is configured (e.g., by an administrator of system policy) with one of two options, namely a soft option or a hard option. More particularly, depending on the signaler option selected (corresponding to operation 704), the signaler 112 configured with the soft option via operation 706 detects whether each segment assigned to a single reader is at the same SignalId, and that the reader is blocked on each segment. If so, the signaler takes whatever action is needed as a result of that signal, and with respect to the reader, and at operation 708 updates the state to set "IsBlocked:=false" for the ReaderId-SegmentName pairs for this reader. As a result, the reader resumes normal reading operations, but now according to whatever mode in which the signal event instructed the reader to operate. Thus, the single reader is synchronized with respect to reading from each of its assigned segments in the changed mode following the event.

If the signaler 112 is configured with the hard option, only when at operation 710 the signaler 112 detects that all segments for all readers are at the same SignalId (and that the readers are blocked), the signaler 112 take whatever action is necessary as a result of that signal. With respect to resuming the readers, at operation 712 the signaler 112 updates the state to set the "IsBlocked:=false" for all tuples in the state information 242. As a result of this, the readers will resume normal operations as synchronized relative to the signal event, e.g., in a new mode.

Note that the signaler does nothing until the above synchronization conditions are satisfied with respect to the soft or hard option. The signaler can perform the appropriate actions following a subsequent state update.

Thus, in an implementation in which the soft/hard option is configured on the signaler, it is up to the signaler to apply the "Signal Policy" to the system. The segment store and controller do not play an active role in the signaling process, but do provide basic primitives and guarantees that enable signaling to work.

Figure 8:
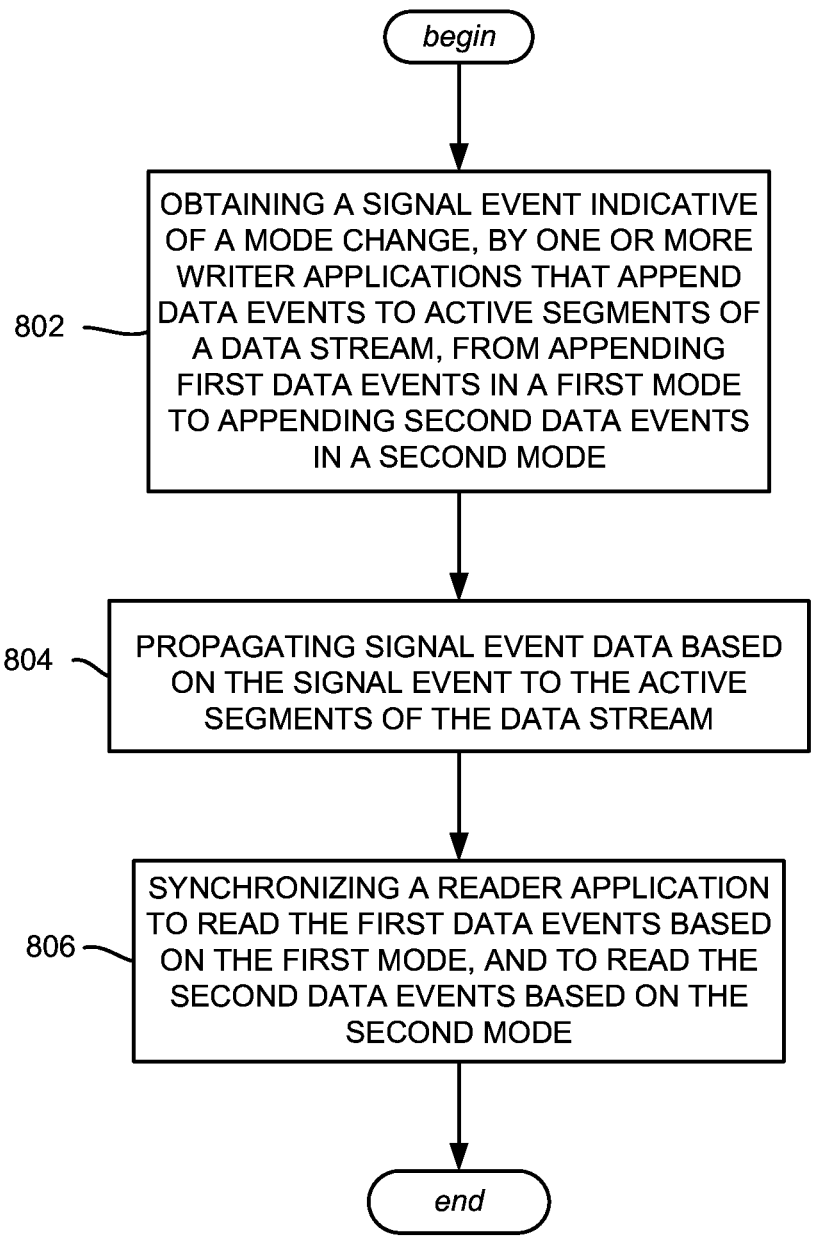
FIG. 8 is a flow diagram showing example operations related to synchronizing a reader application to read data events based on a mode switch corresponding to a signal event, in accordance with various aspects and implementations of the subject disclosure.

One or more aspects can be embodied in a system, such as represented in FIG. 8, and for example can comprise a memory that stores computer executable components and/or operations, and a processor that executes computer executable components and/or operations stored in the memory. Example operations can comprise operation 802, which represents obtaining a signal event indicative of a mode change, by one or more writer applications that append data events to active segments of a data stream, from appending first data events in a first mode to appending second data events in a second mode. Operation 804 represents propagating signal event data based on the signal event to the active segments of the data stream. Operation 806 represents synchronizing a reader application to read the first data events based on the first mode, and to read the second data events based on the second mode.

Further operations can comprise writing the signal event to a signal segment of the data stream; propagating the signal event data to the active segments of the data stream can comprise writing a respective signal reference to the signal event to respective active segments of the data stream.

Propagating the signal event data to the active segments of the data stream can comprise writing respective instances of the signal event to respective active segments.

The reader application can be assigned to read the first data events and the second data events from a group of two or more active segments, the reader application can perform a blocking function to halt reading the first data events from an active segment upon encountering the signal event data propagated to the active segment, and synchronizing the reader application can comprise detecting that the reader application has performed the blocking function to halt reading the first data events from the group of active segments, and, in response to the detecting, unblocking the reader application to resume reading by the reader application to read the second data events from the group of active segments.

The reader application can be part of a group of reader applications assigned to read the first data events and the second data events, the reader application can perform a blocking function to halt reading the first data events from an active segment assigned to that reader application upon encountering the signal event data propagated to the active segment, and synchronizing the reader application can comprise detecting that the group of reader applications has performed the blocking function to halt reading the first data events from the active segments, and, in response to the detecting, unblocking the group of reader applications to resume reading the second data events by the group of reader applications.

Further operations can comprise maintaining shared state, which can comprise, for respective reader applications of the group of reader applications, respective identifiers and respective blocking state data; detecting that the group of reader applications has performed the blocking function to halt reading the first data events from the active segments can comprise determining that the respective blocking state data in the shared state for the respective reader applications indicates that the group of reader applications have blocked states, and unblocking the group of reader applications to resume reading the second data events by the group of reader applications can comprise modifying the blocking state data in the shared state for the group of reader applications from the blocked states to unblocked states.

Further operations can comprise synchronizing the one or more writer applications to prevent the first data events from being appended to the active segments after the signal event, and to prevent the second data events from being appended to the active segments before the signal event.

Synchronizing the one or more writer applications can comprise evaluating a current signal identifier associated with an active segment against a writer-provided signal identifier associated with a data event to be written to the active segment, and rejecting appending of the data event to the active segment in response to the current signal identifier not matching the writer-provided signal identifier.

The current signal identifier can be an attribute of the active segments, and the signal event data can be propagated to respective active segments in conjunction with updating respective current signal identifiers for the respective active segments.

Figure 9:
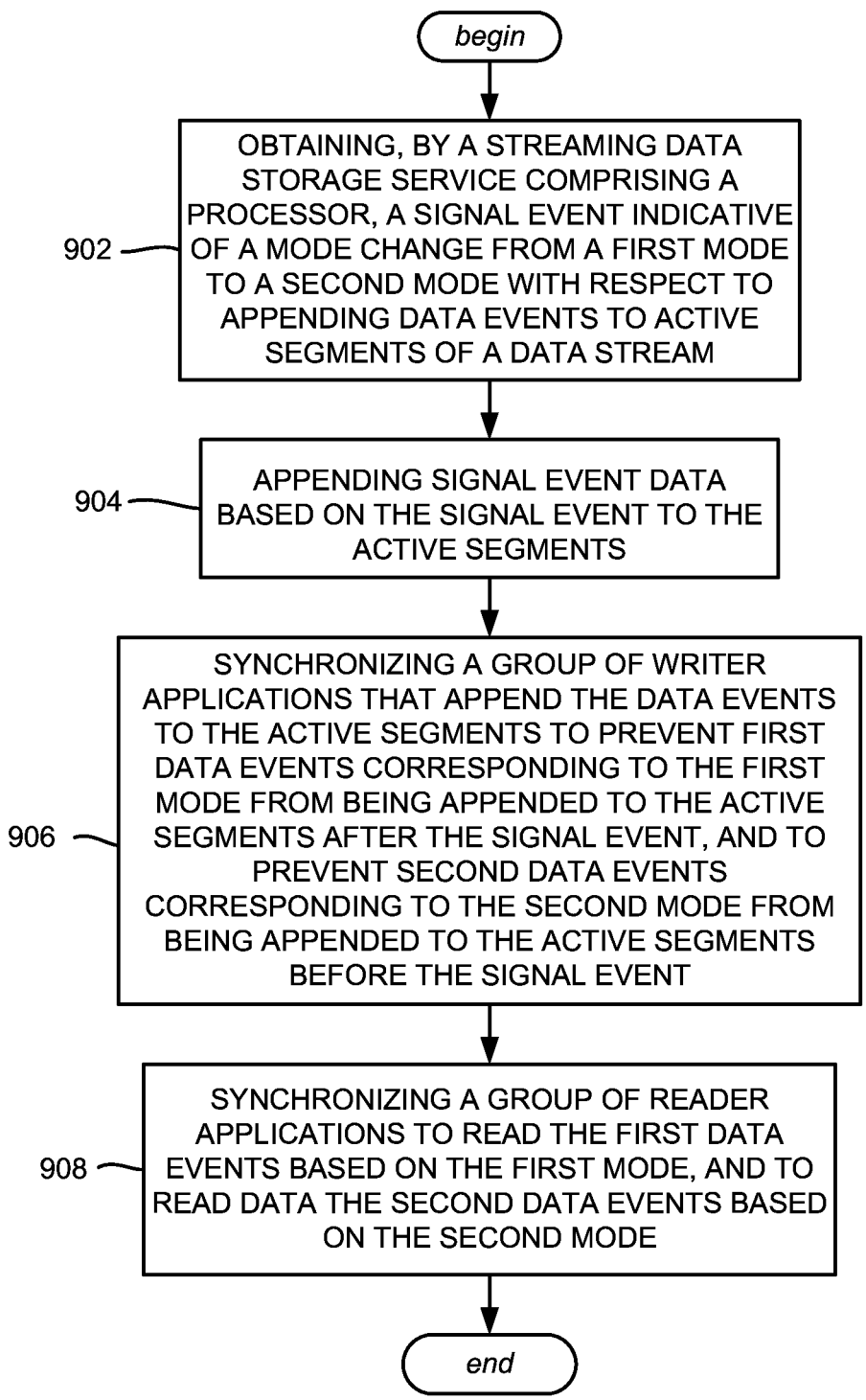
FIG. 9 is a flow diagram showing example operations related to synchronizing writer applications and reader applications with respect to a signal event, in accordance with various aspects and implementations of the subject disclosure.

One or more example aspects, such as corresponding to example operations of a method, are represented in FIG. 9. Operation 902 represents obtaining, by a streaming data storage service comprising a processor, a signal event indicative of a mode change from a first mode to a second mode with respect to appending data events to active segments of a data stream. Operation 904 represents appending signal event data based on the signal event to the active segments. Operation 906 represents synchronizing a group of writer applications that append the data events to the active segments to prevent first data events corresponding to the first mode from being appended to the active segments after the signal event, and to prevent second data events corresponding to the second mode from being appended to the active segments before the signal event. Operation 908 represents synchronizing a group of reader applications to read the first data events based on the first mode, and to read data the second data events based on the second mode.

Synchronizing the group of writer applications can comprise preventing the first data events from being appended to the active segments after the signal event.

Preventing the first data events from being appended to the active segments after the signal event can comprise evaluating a current signal identifier associated with an active segment against a writer-provided signal identifier associated with a data event to be written by a writer application to the active segment, and rejecting appending of the data event to the active segment in response to the current signal identifier not matching the writer-provided signal identifier.

A reader application of the group of reader applications can be assigned to read the first data events and the second data events from a group of two or more active segments; the reader application can block to halt reading the first data events from an active segment upon encountering the signal event data, and synchronizing the reader applications can comprise detecting that the reader application has blocked to halt reading the first data events from the group of active segments, and, in response to the detecting, unblocking the reader application to resume reading by the reader application to read the second data events from the group of active segments.

Aspects can comprise maintaining state data representative of whether the reader application is blocked or unblocked with respect to each active segment of the group of active segments assigned to that reader application, detecting that the active segments assigned to the group of reader applications are blocked can comprise detecting that the state data indicates a blocked state for each active segment, and unblocking the reader application to resume reading by the reader application to read the second data events from the group of active segments can comprise modifying the state data for each active segment to an unblocked state.

Each reader application of the group of reader applications can block from further reading of an active segment assigned thereto upon encountering the signal event data in the active segment; synchronizing the group of reader applications can comprise detecting that the active segments assigned to the group of reader segments are blocked from reading, and in response to the detecting, unblocking the group of reader applications to resume reading starting with the second data events appended after the signal event data.

Aspects can comprise maintaining state data for each reader application of the group, the state data representative of whether a reader application is blocked or unblocked with respect to each active segment assigned to the reader application; detecting that the active segments assigned to the group of reader applications are blocked can comprise detecting that the state data indicates a blocked state for each active segment of the group of reader applications, and unblocking the group of reader applications can comprise modifying the state data for each reader application and each active segment to an unblocked state.

Aspects can comprise writing the signal event to a signal segment of the data stream, and the appending the signal event data to the active segments can comprise writing respective instances of a signal reference to the signal event to respective active segments of the data stream.

Figure 10:
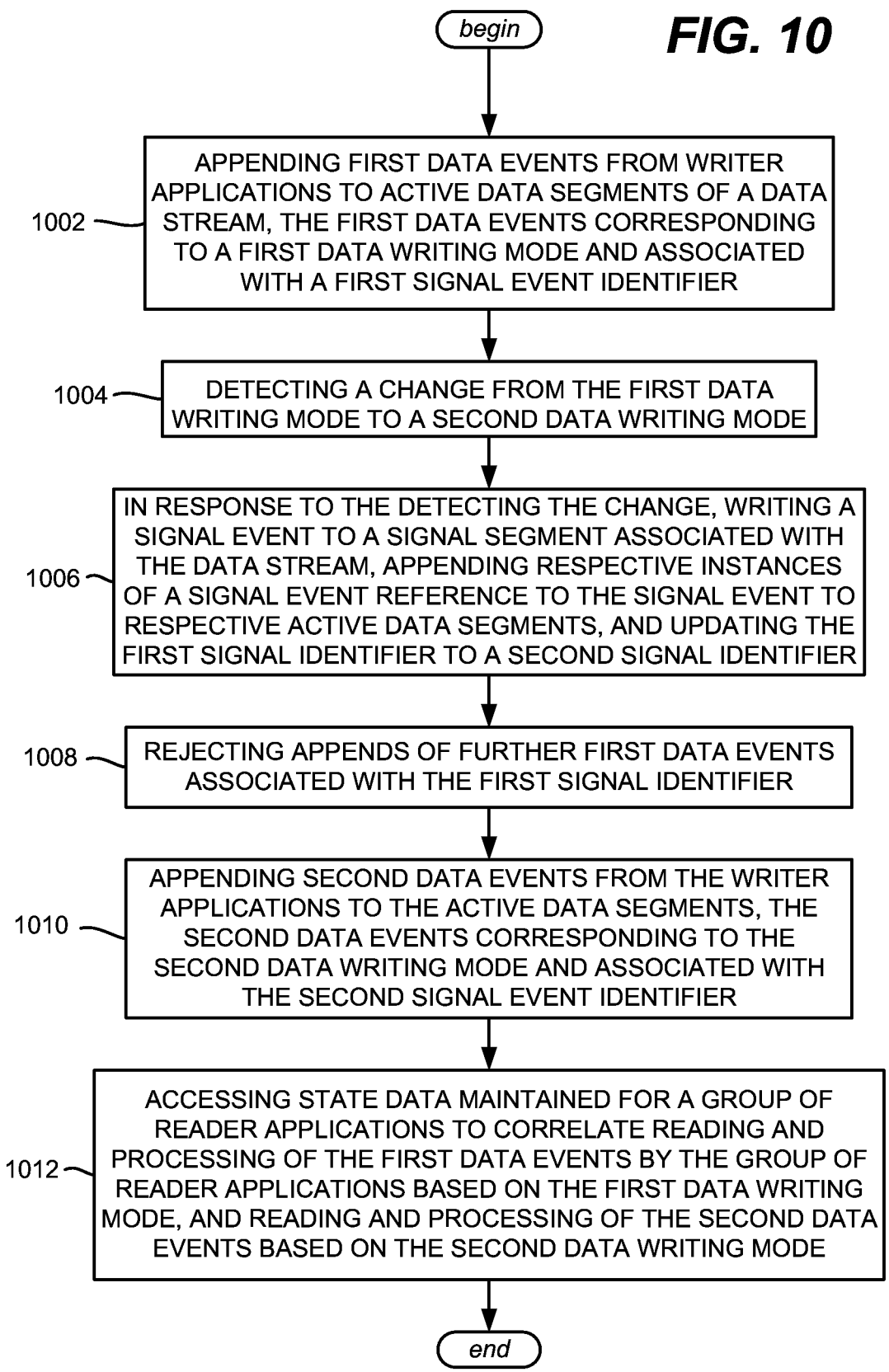
FIG. 10 is a flow diagram showing example operations related to handling events to be appended with respect to a signal, while synchronizing reader applications based on the signal, in accordance with various aspects and implementations of the subject disclosure.

FIG. 10 summarizes various example operations, e.g., corresponding to a machine-readable storage medium, comprising executable instructions that, when executed by a processor of a streaming data storage system, facilitate performance of operations. Operation 1002 represents appending first data events from writer applications to active data segments of a data stream, the first data events corresponding to a first data writing mode and associated with a first signal event identifier. Operation 1004 represents detecting a change from the first data writing mode to a second data writing mode. Operation 1006 represents, in response to the detecting the change, writing a signal event to a signal segment associated with the data stream, appending respective instances of a signal event reference to the signal event to respective active data segments, and updating the first signal identifier to a second signal identifier. Operation 1008 represents rejecting appends of further first data events associated with the first signal identifier. Operation 1010 represents appending second data events from the writer applications to the active data segments, the second data events corresponding to the second data writing mode and associated with the second signal event identifier. Operation 1012 represents accessing state data maintained for a group of reader applications to correlate reading and processing of the first data events by the group of reader applications based on the first data writing mode, and reading and processing of the second data events based on the second data writing mode.

A reader application of the group of reader applications can block to halt reading the first data events from an active segment upon encountering an instance of the signal event reference to the signal event, the reader application can update the state data to indicate a blocked state with respect to reading of the active segment, and accessing the state data can comprise detecting that the reader application has a blocked state for each active segment assigned thereto, and, in response to the detecting, unblocking the reader application for each active segment assigned thereto to resume reading and processing of the second data events by the reader application based on the second data writing mode.

Each reader application of the group of reader applications can block to halt reading the first data events from an active segment upon encountering an instance of the signal event reference to the signal event and can update the state data to indicate a blocked state with respect to reading of the active segment; accessing the state data can comprise detecting that each reader application has a blocked state for each active segment assigned thereto, and, in response to the detecting, unblocking the reader applications for the active segments to resume reading and processing of the second data events by the reader applications based on the second data writing mode.

As can be seen, the technology described herein provides a practical synchronization mechanism to be implemented at the platform level rather than at the applications needing synchronization. Via signal events, the technology can be used to switch system (and event writing and reading) modes in a simple and efficient fashion.

Figure 11:
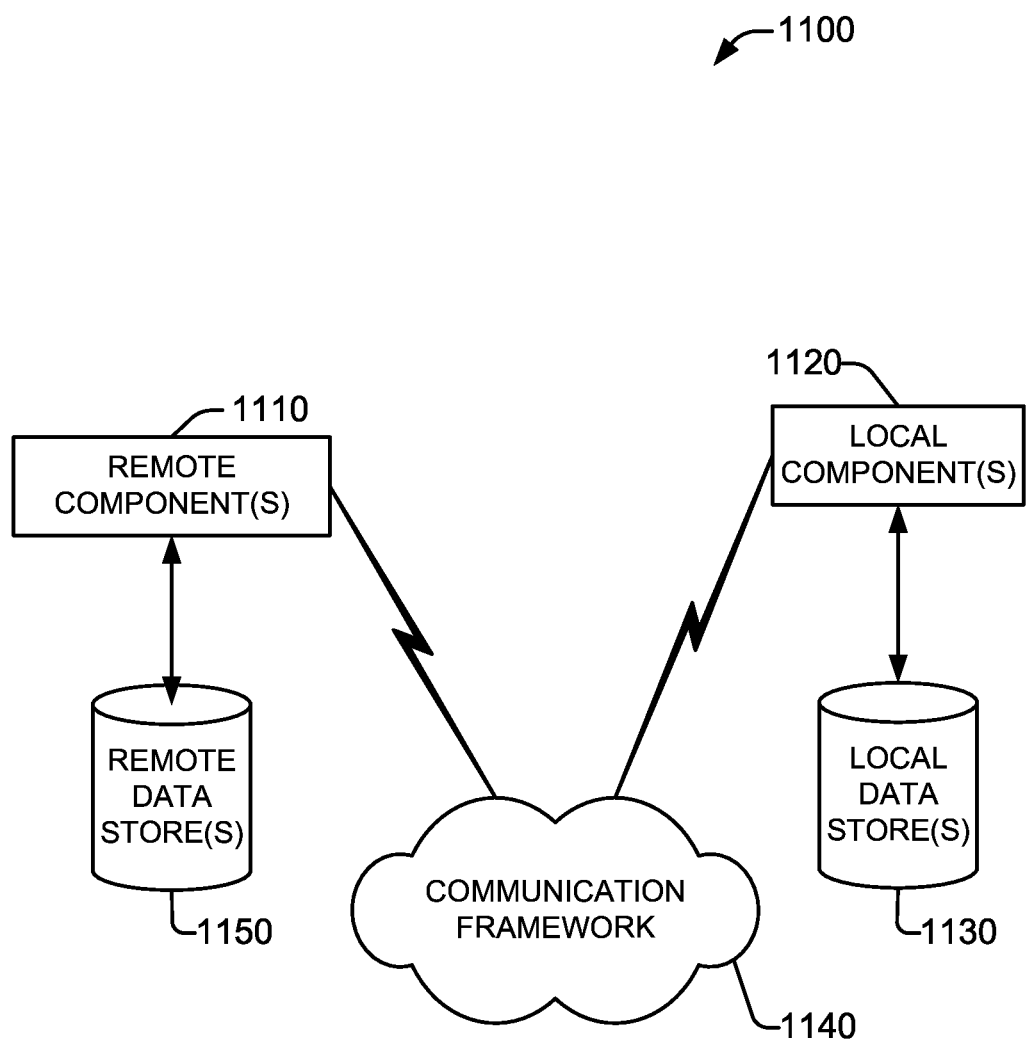
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
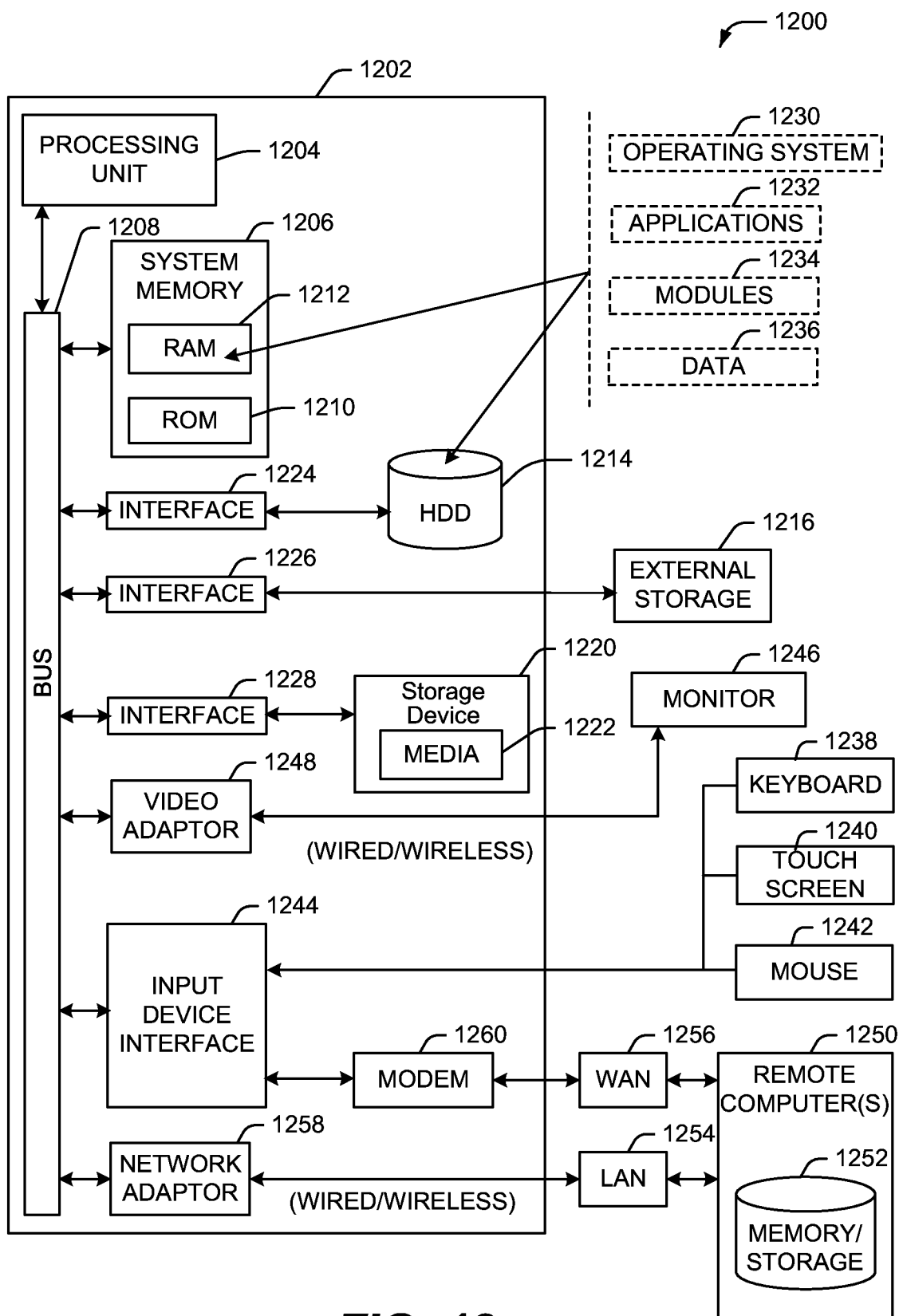
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
obtaining a signal event indicative of a mode change, by one or more writer applications that append data events to active segments of a data stream, from appending first data events in a first mode to appending second data events in a second mode;
propagating signal event data based on the signal event to the active segments of the data stream; and
synchronizing a reader application to read the first data events based on the first mode, and to read the second data events based on the second mode.

2. The system of claim 1, wherein the operations further comprise writing the signal event to a signal segment of the data stream, and wherein the propagating the signal event data to the active segments of the data stream comprises writing a respective signal reference to the signal event to respective active segments of the data stream.

3. The system of claim 1, wherein the propagating the signal event data to the active segments of the data stream comprises writing respective instances of the signal event to respective active segments.

4. The system of claim 1, wherein the reader application is assigned to read the first data events and the second data events from a group of two or more active segments, wherein the reader application performs a blocking function to halt reading the first data events from an active segment upon encountering the signal event data propagated to the active segment, and, wherein the synchronizing the reader application comprises detecting that the reader application has performed the blocking function to halt reading the first data events from the group of active segments, and, in response to the detecting, unblocking the reader application to resume reading by the reader application to read the second data events from the group of active segments.

5. The system of claim 1, wherein the reader application is part of a group of reader applications assigned to read the first data events and the second data events, wherein the reader application performs a blocking function to halt reading the first data events from an active segment assigned to that reader application upon encountering the signal event data propagated to the active segment, and wherein the synchronizing the reader application comprises detecting that the group of reader applications has performed the blocking function to halt reading the first data events from the active segments, and, in response to the detecting, unblocking the group of reader applications to resume reading the second data events by the group of reader applications.

6. The system of claim 5, wherein the operations further comprise maintaining shared state, comprising, for respective reader applications of the group of reader applications, respective identifiers and respective blocking state data, wherein the detecting that the group of reader applications has performed the blocking function to halt reading the first data events from the active segments comprises determining that the respective blocking state data in the shared state for the respective reader applications indicates that the group of reader applications have blocked states, and wherein the unblocking the group of reader applications to resume reading the second data events by the group of reader applications comprises modifying the blocking state data in the shared state for the group of reader applications from the blocked states to unblocked states.

7. The system of claim 1, wherein the operations further comprise synchronizing the one or more writer applications to prevent the first data events from being appended to the active segments after the signal event, and to prevent the second data events from being appended to the active segments before the signal event.

8. The system of claim 7, wherein the synchronizing the one or more writer applications comprises evaluating a current signal identifier associated with an active segment against a writer-provided signal identifier associated with a data event to be written to the active segment, and rejecting appending of the data event to the active segment in response to the current signal identifier not matching the writer-provided signal identifier.

9. The system of claim 8, wherein the current signal identifier is an attribute of the active segments, and wherein the signal event data is propagated to respective active segments in conjunction with updating respective current signal identifiers for the respective active segments.

10. A method, comprising:
obtaining, by a streaming data storage service comprising a processor, a signal event indicative of a mode change from a first mode to a second mode with respect to appending data events to active segments of a data stream;
appending signal event data based on the signal event to the active segments;
synchronizing a group of writer applications that append the data events to the active segments to prevent first data events corresponding to the first mode from being appended to the active segments after the signal event, and to prevent second data events corresponding to the second mode from being appended to the active segments before the signal event; and
synchronizing a group of reader applications to read the first data events based on the first mode, and to read data the second data events based on the second mode.

11. The method of claim 10, wherein the synchronizing the group of writer applications comprises preventing the first data events from being appended to the active segments after the signal event.

12. The method of claim 11, wherein the preventing the first data events from being appended to the active segments after the signal event comprises evaluating a current signal identifier associated with an active segment against a writer-provided signal identifier associated with a data event to be written by a writer application to the active segment, and rejecting appending of the data event to the active segment in response to the current signal identifier not matching the writer-provided signal identifier.

13. The method of claim 10, wherein a reader application of the group of reader applications is assigned to read the first data events and the second data events from a group of two or more active segments, wherein the reader application blocks to halt reading the first data events from an active segment upon encountering the signal event data, and wherein the synchronizing the reader applications comprises detecting that the reader application has blocked to halt reading the first data events from the group of active segments, and, in response to the detecting, unblocking the reader application to resume reading by the reader application to read the second data events from the group of active segments.

14. The method of claim 13, further comprising maintaining state data representative of whether the reader application is blocked or unblocked with respect to each active segment of the group of active segments assigned to that reader application, wherein the detecting that the active segments assigned to the group of reader applications are blocked comprises detecting that the state data indicates a blocked state for each active segment, and wherein unblocking the reader application to resume reading by the reader application to read the second data events from the group of active segments comprises modifying the state data for each active segment to an unblocked state.

15. The method of claim 10, wherein each reader application of the group of reader applications blocks from further reading of an active segment assigned thereto upon encountering the signal event data in the active segment, and wherein synchronizing the group of reader applications comprises detecting that the active segments assigned to the group of reader segments are blocked from reading, and in response to the detecting, unblocking the group of reader applications to resume reading starting with the second data events appended after the signal event data.

16. The method of claim 15, further comprising maintaining state data for each reader application of the group, the state data representative of whether a reader application is blocked or unblocked with respect to each active segment assigned to the reader application, wherein the detecting that the active segments assigned to the group of reader applications are blocked comprises detecting that the state data indicates a blocked state for each active segment of the group of reader applications, and wherein unblocking the group of reader applications comprises modifying the state data for each reader application and each active segment to an unblocked state.

17. The method of claim 10, further comprising writing the signal event to a signal segment of the data stream, and wherein the appending the signal event data to the active segments comprises writing respective instances of a signal reference to the signal event to respective active segments of the data stream.

18. A non-transitory machine-readable medium, comprising executable instructions that, when executed by a processor of a streaming data storage system, facilitate performance of operations, the operations comprising:
appending first data events from writer applications to active data segments of a data stream, the first data events corresponding to a first data writing mode and associated with a first signal event identifier;
detecting a change from the first data writing mode to a second data writing mode;
in response to the detecting the change, writing a signal event to a signal segment associated with the data stream, appending respective instances of a signal event reference to the signal event to respective active data segments, and updating the first signal identifier to a second signal identifier;
rejecting appends of further first data events associated with the first signal identifier;
appending second data events from the writer applications to the active data segments, the second data events corresponding to the second data writing mode and associated with the second signal event identifier; and
accessing state data maintained for a group of reader applications to correlate reading and processing of the first data events by the group of reader applications based on the first data writing mode, and reading and processing of the second data events based on the second data writing mode.

19. The non-transitory machine-readable medium of claim 18, wherein a reader application of the group of reader applications blocks to halt reading the first data events from an active segment upon encountering an instance of the signal event reference to the signal event, wherein the reader application updates the state data to indicate a blocked state with respect to reading of the active segment, and wherein accessing the state data comprises detecting that the reader application has a blocked state for each active segment assigned thereto, and, in response to the detecting, unblocking the reader application for each active segment assigned thereto to resume reading and processing of the second data events by the reader application based on the second data writing mode.

20. The non-transitory machine-readable medium of claim 18, wherein each reader application of the group of reader applications blocks to halt reading the first data events from an active segment upon encountering an instance of the signal event reference to the signal event and updates the state data to indicate a blocked state with respect to reading of the active segment, and wherein accessing the state data comprises detecting that each reader application has a blocked state for each active segment assigned thereto, and, in response to the detecting, unblocking the reader applications for the active segments to resume reading and processing of the second data events by the reader applications based on the second data writing mode.

* * * * *